US012700319B2

(12) United States Patent
Mazoin et al.

(10) Patent No.: US 12,700,319 B2
(45) Date of Patent: Aug. 4, 2026

(54) METHOD FOR MANAGING TAXIING PATHS

(71) Applicants: AIRBUS SAS, Blagnac (FR); AIRBUS OPERATIONS SAS, Toulouse (FR)

(72) Inventors: Benjamin Mazoin, Toulouse (FR); Laura Fersing, Blagnac (FR)

(73) Assignees: AIRBUS SAS, Blagnac (FR); AIRBUS OPERATIONS SAS, Toulouse (FR)

( * ) Notice: Subject to any disclaimer, the term of this patent is extended or adjusted under 35 U.S.C. 154(b) by 16 days.

(21) Appl. No.: 18/806,150

(22) Filed: Aug. 15, 2024

(65) Prior Publication Data

US 2025/0078670 A1 Mar. 6, 2025

(51) Int. Cl.
| | |
|---|---|
| *G08G 5/00* | (2025.01) |
| *B64D 43/00* | (2006.01) |
| *G08G 5/53* | (2025.01) |
| *G08G 5/55* | (2025.01) |
| *G06F 3/04842* | (2022.01) |

(52) U.S. Cl.
CPC .............. *G08G 5/53* (2025.01); *B64D 43/00* (2013.01); *G08G 5/55* (2025.01); *G06F 3/04842* (2013.01)

(58) Field of Classification Search
CPC .. G08G 5/53; G08G 5/55; G08G 5/26; G08G 5/32; G08G 5/34; G08G 5/51; G08G 5/21; B64D 43/00; G06F 3/04842; G01C 21/36
See application file for complete search history.

(56) References Cited

U.S. PATENT DOCUMENTS

| | | | | |
|---|---|---|---|---|
| 8,560,214 B1* | 10/2013 | Krenz | ..................... | G08G 5/21 |
| | | | | 701/117 |
| 8,793,038 B1* | 7/2014 | Schultz | .................. | G01C 23/00 |
| | | | | 701/410 |
| 2012/0316766 A1* | 12/2012 | Lafon | .................... | G01C 21/34 |
| | | | | 701/120 |
| 2015/0154874 A1* | 6/2015 | Murthy | ................... | G08G 5/21 |
| | | | | 701/120 |

(Continued)

FOREIGN PATENT DOCUMENTS

| | | |
|---|---|---|
| EP | 3023966 A1 | 5/2016 |
| EP | 3200171 A1 | 8/2017 |

(Continued)

OTHER PUBLICATIONS

Mar. 7, 2024 Search Report issued in French Patent Application No. 2309165.

(Continued)

*Primary Examiner* — Peter D Nolan
*Assistant Examiner* — Peter Y Ning
(74) *Attorney, Agent, or Firm* — Williams Mullen; R. Brian Drozd

(57) ABSTRACT

A method for managing taxiing paths of an aircraft includes at least one computer system, the method being implemented by the computer system. The method includes the following steps: editing an initial path; displaying a route of the initial path on a screen using a first route symbolism; obtaining a validation of the initial path; displaying a route of the validated initial path on the screen using a second route symbolism; implementing the validated initial path in a taxiing setpoint of the aircraft. The method further includes an editing process and an independent display process.

18 Claims, 3 Drawing Sheets

(56)                    References Cited

U.S. PATENT DOCUMENTS

| | | | | |
|---|---|---|---|---|
| 2016/0140849 | A1 * | 5/2016 | Ball | G06F 3/04847 |
| | | | | 701/538 |
| 2016/0328977 | A1 * | 11/2016 | Lueck | G01C 21/20 |
| 2018/0366008 | A1 * | 12/2018 | Dacre-Wright | G01C 21/20 |
| 2018/0374370 | A1 * | 12/2018 | Hvezda | G08G 5/727 |
| 2022/0005364 | A1 * | 1/2022 | Wang | G08G 5/51 |
| 2022/0262266 | A1 * | 8/2022 | Mathew | G08G 5/21 |
| 2022/0307853 | A1 * | 9/2022 | Davis | G01C 21/3492 |

FOREIGN PATENT DOCUMENTS

| | | | | | |
|---|---|---|---|---|---|
| EP | 3660461 | A1 * | 6/2020 | | G01C 23/005 |
| EP | 4047320 | A1 | 8/2022 | | |
| FR | 2937431 | A1 * | 4/2010 | | G08G 5/51 |
| FR | 3013881 | A1 * | 5/2015 | | G08G 5/51 |
| JP | 2022169467 | A * | 11/2022 | | G06F 3/04842 |

OTHER PUBLICATIONS

Eurocontrol: "Eurocontrol ITWP HMI Description;" retrieved from internet: URL: https://www.eurocontrol.int/sites/default/files/publication/files/itwp-hmi-description-v4-20012017.pdf; Jun. 4, 2018.

* cited by examiner

*100*

101 — Receive instruction to edit 2a

102 — Command display of 2a using 10a

Edit

104 — Receive validation of 4a

110

106 — Command display of 4a using 10b

Display

150

108 — Implement 4

*110*

111 — Receive editing instruction

112 — Command display using 10a

114 — Receive validation

116 — Command display using 10b

151 — Command display of 20

152 — Receive selection instruction selecting 20

150

200

201 CPU

202 RAM

203 ROM

204 SD

205 I/O

210

220 HMI

221

METHOD FOR MANAGING TAXIING PATHS

TECHNICAL FIELD

The invention relates to the field of managing taxiing paths of an aircraft.

PRIOR ART

In a known manner, aircraft are required to taxi at airports between a passenger embarkation or disembarkation gate and a take-off or landing runway. To do this, they each follow a path on the surface of the airport. This path is generally in accordance with a taxiing clearance (i.e. an authorization) received from air-traffic control. It generally comprises taxiing over taxiways or segments of taxiways, and waypoints.

Modern aircraft generally have an airport navigation system that comprises a navigation screen intended to display a desired navigation path on a map of an airport. During taxiing, the navigation system further displays a current position of the aircraft on the navigation screen. In order to ensure correct operation of the navigation system, it is desirable for a crew member (pilot or co-pilot) to configure the desired navigation path in the navigation system before the taxiing phase. Current navigation systems comprise a field for defining the desired path, in which field a pilot is able to enter a desired path or insert a clearance received from air-traffic control. However, when the pilot wishes to modify an already validated path (whether it be a path entered by the pilot or a clearance received from air-traffic control), these current systems do not allow her or him to see the modifications with respect to the previously validated path. Thus, it is difficult for the pilot to compare the modified path with the previously validated path, this making it difficult to choose between abandoning or continuing with a modification of a path. Pilots are sometimes required to use a pencil to note changes on paper, to compare them with the initial route. This prevents an ease of interaction that would however be desirable when making a simple path change during taxiing.

In this context, it is necessary to provide a path-managing method that allows a path to be edited, displayed and implemented simply.

SUMMARY OF THE INVENTION

To this end, according to a first aspect, a method for managing taxiing paths of an aircraft is provided, the aircraft comprising at least one computer system comprising electronic circuitry and a human-machine interface comprising at least one display screen, the method being implemented by the computer system.

The method comprises at least the following steps:
receiving from a user, via the human-machine interface, editing instructions and editing an initial path depending on said instructions;
commanding display on the screen of a route of the initial path being edited, using a first route symbolism;
receiving a validation instruction indicating validation of the initial path by the user via the human-machine interface;
commanding display on the screen of a route of the initial path validated by the user, using a second route symbolism;
implementing the initial path validated by the user in a taxiing setpoint of the aircraft.

The method further comprises an editing process which comprises the following steps:
receiving from the user, via the human-machine interface, editing instructions and editing an alternative path depending on said editing instructions;
commanding display on the screen of a route of the alternative path being edited, using the first route symbolism;
receiving a validation instruction indicating validation of the alternative path by the user via the human-machine interface;
replacing display of the route of the initial path validated by the user, with display of the route of the alternative path validated by the user, on the screen using the second route symbolism;
implementing the alternative path validated by the user in the taxiing setpoint of the aircraft.

The method comprises in parallel an independent display process which comprises:
commanding display on the screen of a graphical object selectable via the human-machine interface, the graphical object being distinct for each path; and
receiving a selection instruction indicating selection by the user of the graphical object via the human-machine interface and displaying on said screen the path corresponding to the selected graphical object.

Thus, the managing method makes it possible to edit an initial path, to validate it and to implement it in the taxiing setpoint of the aircraft. Furthermore, the method according to the invention makes it possible to edit an alternative path, to display it, to validate it and to implement it in the taxiing setpoint of the aircraft. Thus, in other words, the method according to the invention very advantageously makes it possible to manage a plurality of taxiing paths, to edit them and to display them using distinct route symbolisms allowing a user to easily see the various paths.

According to one particular arrangement, the method comprises editing a plurality of distinct alternative paths.

According to one particular arrangement, the method comprises displaying a route of each of the distinct alternative paths using one distinct route symbolism for each of the distinct alternative paths.

According to one particular arrangement, the method comprises selecting one alternative path from among the plurality of distinct alternative paths, then obtaining a validation of the selected alternative path.

According to one particular arrangement, the method comprises receiving a cancellation instruction, through selection of the graphical object by the user on the human-machine interface, and comprises cancelling the path corresponding to the graphical object.

According to one particular arrangement, the method comprises receiving an editing instruction, through selection of the graphical object by the user on the human-machine interface, and implementing the editing process on the path corresponding to the graphical object.

According to one particular arrangement, the method comprises:
receiving a path from an air-traffic-control authority;
receiving from the user, via the human-machine interface, an instruction to display the path received from the air-traffic-control authority;
commanding display on the screen of a route of the path received from the air-traffic-control authority, using a third route symbolism;

receiving from the user, via the human-machine interface, a validation instruction indicating validation of the path received from air-traffic control;

replacing display of the route of the path validated by the user, with display of the route of the path received from the air-traffic-control authority then validated by the user, on the screen using the second route symbolism;

implementing the path received from the air-traffic-control authority then validated by the user, in a taxiing setpoint of the aircraft.

According to one particular arrangement, the method comprises:

receiving a path from an air-traffic-control authority;

receiving from the user, via the human-machine interface, an instruction to display the path received from the air-traffic-control authority;

commanding display on the screen of a route of the path received from the air-traffic-control authority, using a third route symbolism;

receiving from the user, via the human-machine interface, editing instructions and editing the path received from the air-traffic-control authority depending on said editing instructions;

commanding display on the screen of a route of the path being edited, using the first route symbolism;

receiving from the user, via the human-machine interface, a validation instruction indicating validation of the path being edited;

replacing display of the route of the path validated by the user, with display of the route of the path received from the air-traffic-control authority then edited and validated by the user, on the screen using the second route symbolism;

implementing the path received from the air-traffic-control authority then edited and validated by the user, in a taxiing setpoint of the aircraft.

According to another aspect, a computer system for managing a taxiing route of an aircraft is provided, said computer system comprising electronic circuitry for implementing the method for managing a taxiing route of an aircraft comprising at least the following steps:

receiving from a user, via the human-machine interface, editing instructions and editing an initial path depending on said instructions;

commanding display on the screen of a route of the initial path being edited, using a first route symbolism;

receiving a validation instruction indicating validation of the initial path by the user via the human-machine interface;

commanding display on the screen of a route of the initial path validated by the user, using a second route symbolism;

implementing the initial path validated by the user in a taxiing setpoint of the aircraft;

the method further comprising an editing process which comprises the following steps:

receiving from the user, via the human-machine interface, editing instructions and editing an alternative path depending on said editing instructions;

commanding display on the screen of a route of the alternative path being edited, using the first route symbolism;

receiving a validation instruction indicating validation of the alternative path by the user via the human-machine interface;

replacing display of the route of the initial path validated by the user, with display of the route of the alternative path validated by the user, on the screen using the second route symbolism;

implementing the alternative path validated by the user in the taxiing setpoint of the aircraft; and the method comprising in parallel an independent display process which comprises:

commanding display on the screen of a graphical object selectable via the human-machine interface, the graphical object being distinct for each path; and receiving a selection instruction indicating selection by the user of the graphical object via the human-machine interface and displaying on the screen the path corresponding to the selected graphical object.

According to one particular arrangement, the display screen has at least one area for displaying a path and at least one area for displaying a selectable graphical object.

According to one particular arrangement, at least one area for displaying a path is intended to display at least one from among a path validated by a user, a path being edited and a path received from an air-traffic-control authority.

According to one particular arrangement, the computer system comprises at least one area for displaying a text field.

According to another aspect, an aircraft comprising a computer system according to the invention is provided.

According to another aspect, a computer program product is provided that comprises program code instructions for executing the method according to the invention, when said instructions are executed by at least one processor.

According to another aspect, a non-transitory storage medium is provided, on which storage medium is stored a computer program comprising program code instructions for executing the method according to the invention, when said instructions are read from said non-transitory storage medium and executed by a processor.

BRIEF DESCRIPTION OF THE DRAWINGS

The aforementioned features of the invention, and others, will become more clearly apparent on reading the following description of at least one example of embodiment, said description being given with reference to the appended drawings, in which.

DETAILED DESCRIPTION OF EMBODIMENTS

Path-Managing Method

Figure 1:
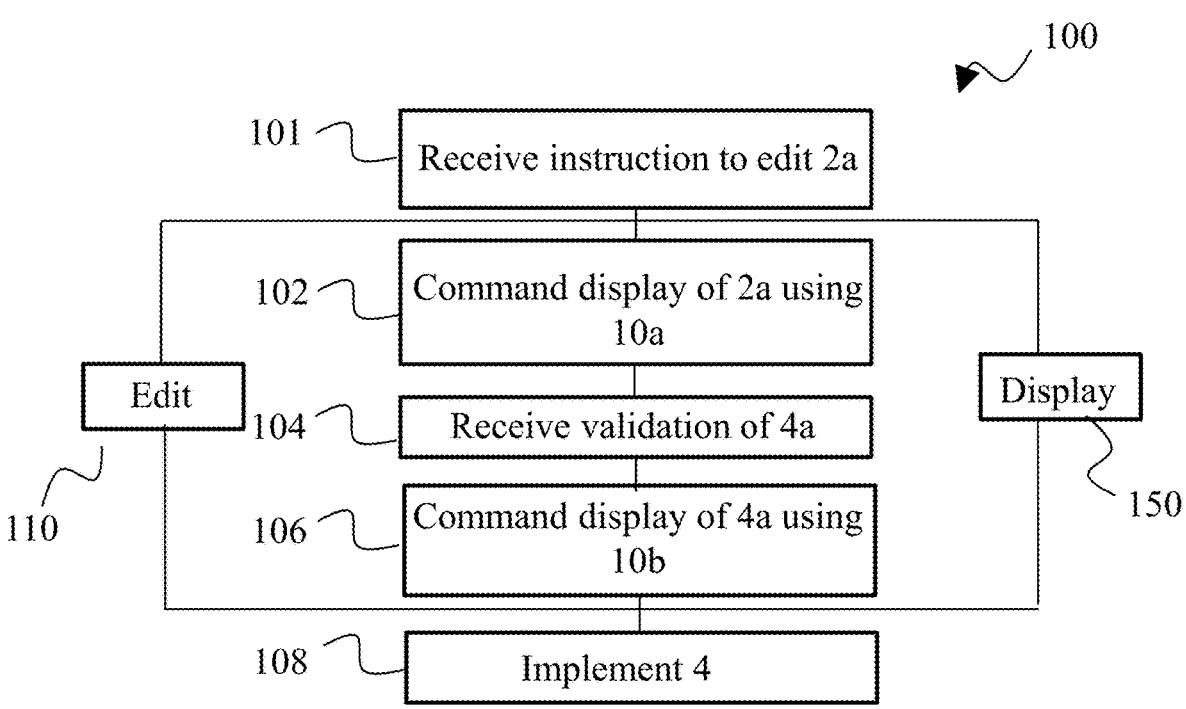
FIG. 1 schematically illustrates a method for managing taxiing paths.

With reference to FIG. 1, according to a first aspect, a method 100 is provided for managing taxiing paths of an aircraft.

The method 100 is implemented by a computer system 200 of the aircraft, which will be described below. The computer system 200 comprises at least one human-machine interface 220, which comprises a display screen 221.

A status is associated with each taxiing path. This status may take at least one of the two following values: "path being edited" and "validated path".

The method 100 comprises at least the following steps:

receiving from a user, via the human-machine interface 220, editing instructions and editing 101 an initial path 2*a* depending on said instructions;

attributing the value "path being edited" to the status associated with the initial path 2*a;* commanding display 102 on the screen 221 of a route of the initial path 2*a* being edited, using a first route symbolism 10*a;* receiving 104 a validation instruction indicating validation of the initial path 4*a* by the user via the human-machine interface 220;

attributing the value "validated path" to the status associated with the initial path 4*a;* commanding display 106 on the screen 221 of a route of the initial path 4*a* validated by the user, using a second route symbolism 10*b;* implementing 108 the initial path 4*a* validated by the user in a taxiing setpoint of the aircraft.

Furthermore, the method 100 comprises an editing process 110 which will be detailed below. As will be detailed below, the editing process 110 makes it possible to edit an alternative path 2*b*.

In addition, the method 100 also comprises in parallel an independent display process 150 which will be detailed below. As described below, the display process allows selectable graphical objects 20 to be displayed. One selectable graphical object is associated with each taxiing path.

Thus, the managing method 100 makes it possible to edit an initial path 2*a*, to validate it and to implement it in the taxiing setpoint of the aircraft. Furthermore, the method according to the invention makes it possible to edit an alternative path 2*b*, to display it, to validate it and to implement it in the taxiing setpoint of the aircraft. Thus, in other words, the method 100 according to the invention very advantageously makes it possible to manage a plurality of taxiing paths, to edit them and to display them using distinct route symbolisms 10 allowing a user to easily see the various paths.

In other words, the invention provides a path-managing method 100 that allows a path to be edited, displayed and implemented simply. In particular, parallel implementation of the display process 150 makes it possible to constantly display one or more selectable graphical objects 20, regardless of the step being implemented. This arrangement is particularly advantageous because it makes it possible to select a selectable graphical object 20 at any time.

As indicated, the method 100 makes it possible to manage, edit and validate taxiing paths. For the sake of clarity, it will be noted that, in the present document, paths being edited are numbered 2, paths validated by the user are numbered 4 and paths received from an air-traffic-control authority are numbered 6.

Receipt of a Path Transmitted by an Air-Traffic-Control Authority

Figures 5, 6:
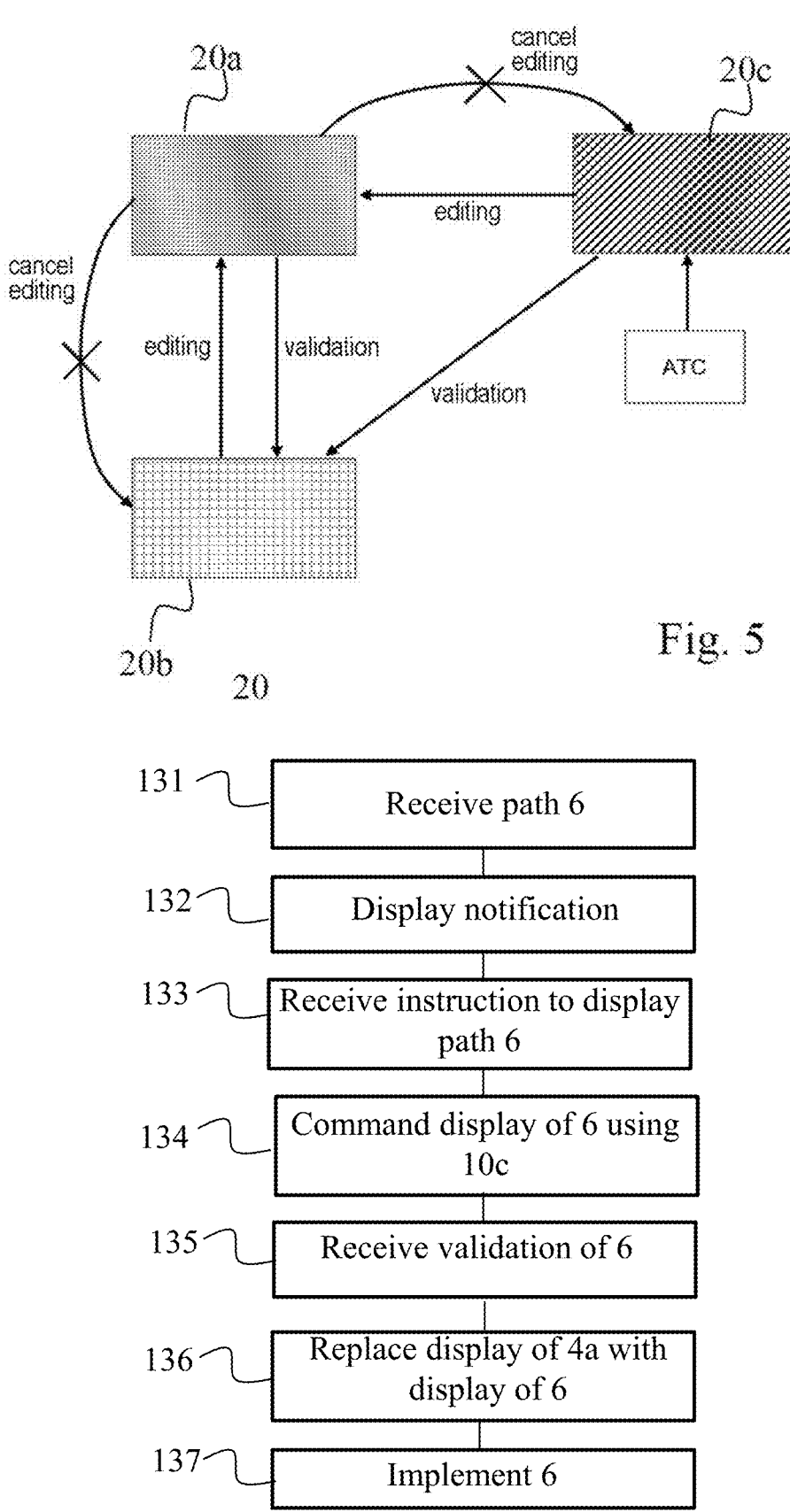
FIG. 5 schematically illustrates display of a plurality of graphical objects.
FIG. 6 schematically illustrates receipt of a path transmitted by an air-traffic-control authority.

As schematically shown in FIG. 6, in one particular arrangement, a path 6 is received from an air-traffic-control authority (also abbreviated A.T.C.). This path for example corresponds to a clearance. According to this particular arrangement, apart from the two aforementioned values, the status associated with a taxiing path may also take the value "path received from air-traffic control".

According to this arrangement, the method 100 comprises the following steps:

receiving 131 a path 6 from an air-traffic-control authority;

attributing the value "path received from air-traffic control" to the status associated with the path 6;

preferably, displaying 132 a notification for the attention of the user, informing her or him of receipt of the path 6 from the air-traffic-control authority;

receiving 133 from the user, via the human-machine interface 220, an instruction to display the path 6 received from the air-traffic-control authority;

commanding 134 display on the screen 220 of a route of the path 6 received from the air-traffic-control authority, using a third route symbolism 10*c;* receiving 135 from the user, via the human-machine interface 220, a validation instruction indicating validation of the path 6 received from air-traffic control;

attributing the value "validated path" to the status associated with the path 6;

replacing 136 display of the route of the path 4*a* validated by the user, with display of the route of the path 6 received from the air-traffic-control authority then validated by the user, on the screen using the second route symbolism 10*b;* implementing 137 the path received from the air-traffic-control authority 6, then validated by the user, in a taxiing setpoint of the aircraft.

Editing Process

Figure 2:
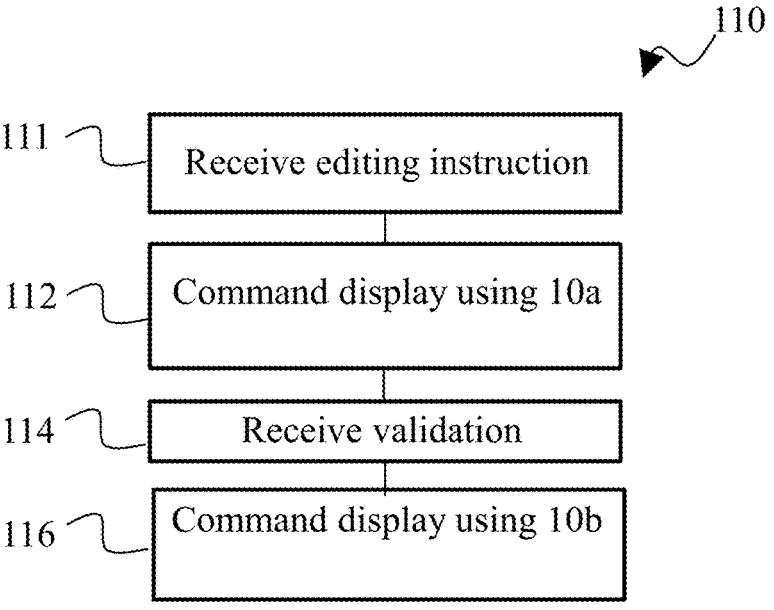
FIG. 2 schematically illustrates an editing method of a method for managing taxiing paths.

As schematically shown in FIG. 2, the editing process 110 in particular comprises the following steps:

receiving 111 from the user, via the human-machine interface 220, editing instructions and editing an alternative path 2*b* depending on said editing instructions;

attributing the value "path being edited" to the status associated with the alternative path 2*b;* commanding 112 display on the screen 221 of a route of the alternative path 2*b* being edited using the first route symbolism 10*a;* receiving 114 a validation instruction indicating validation of the alternative path 4*b* by the user via the human-machine interface 220;

attributing the value "validated path" to the status associated with the alternative path 4*b;* replacing 116 display of the route of the initial path 2*b* validated by the user, with display of the route of the alternative path 4*b* validated by the user, on the screen 221 using the second route symbolism 10*b;* and implementing 118 the alternative path 4*b* validated by the user in the taxiing setpoint of the aircraft.

In the editing process 110, the alternative path is numbered 2*b* before its validation, then 4*b* after its validation, in accordance with the aforementioned numbering 2 (path being edited), 4 (validated path) and 6 (path received from an air-traffic-control authority).

The editing process 110 may also be implemented after receipt and display of a path 6 transmitted by an air-traffic-control authority. According to this arrangement, the method 100 then comprises the following steps:

receiving a path 6 from an air-traffic-control authority;

attributing the value "path received from air-traffic control" to the status associated with the path 6;

preferably, displaying a notification for the attention of the user, informing her or him of receipt of the path 6 from the air-traffic-control authority;

receiving from the user, via the human-machine interface, an instruction to display the path 6 received from the air-traffic-control authority;

commanding display on the screen of a route of the path 6 received from the air-traffic-control authority, using a third route symbolism 10c;

receiving from the user, via the human-machine interface, editing instructions and editing the path 6 received from the air-traffic-control authority depending on said editing instructions;

attributing the value "path being edited" to the status associated with the path 6;

commanding display on the screen of a route of the path being edited, using the first route symbolism 10a;

receiving a validation instruction indicating validation by the user of the path being edited via the human-machine interface;

attributing the value "validated path" to the status associated with the path 6;

replacing display of the route of the path 4a, 4b validated by the user, with display of the route of the path 6 received from the air-traffic-control authority then edited and validated by the user, on the screen using the second route symbolism 10b;

implementing the path 6 received from the air-traffic-control authority then edited and validated by the user, in a taxiing setpoint of the aircraft.

Independent Display Process

Figure 3:
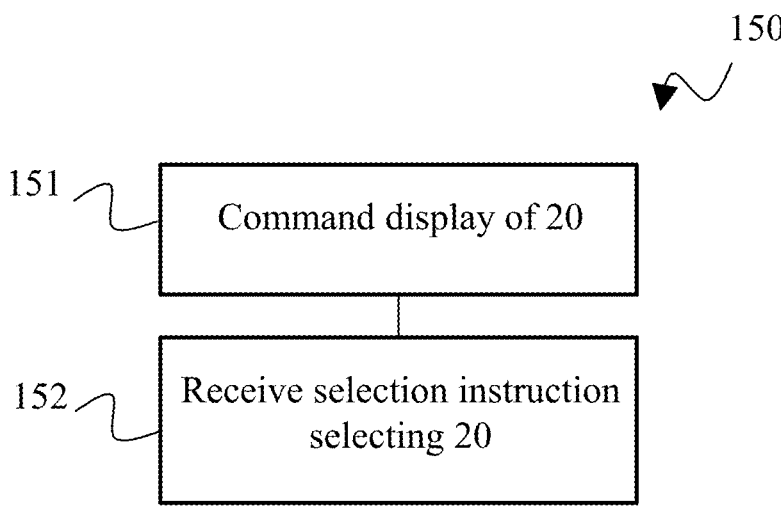
FIG. 3 schematically illustrates a display method included in a method for managing taxiing paths.

As schematically shown in FIG. 3, the independent display process 150 comprises the following steps:

commanding 151 display, on the screen 221, of a graphical object 20 selectable via the human-machine interface 220, the graphical object 20 being distinct for each path 2, 4 or 6 and having a visual appearance dependent on the status associated with the path with which this graphical object is associated; and receiving 152 a selection instruction indicating selection, by the user, of the graphical object 20 via the human-machine interface 220 and displaying on the screen 221 the path 2, 4 or 6 corresponding to the selected graphical object 20.

It will be noted that display on the screen 221 of the path corresponding to the selected graphical object 20 comprises displaying a route of the path using one distinct route symbolism 10 for each of the distinct paths existing in the method (i.e. for each path having been edited and/or validated). This arrangement allows a plurality of paths to be displayed in parallel and them to be told apart.

It will be noted that by different route symbolism 10, what is meant is that each route has at least one particular graphical characteristic. Thus, by way of example, it is possible for each path 2, 4 or 6 to be represented using a different colour. The different route symbolism 10 for each path 2, 4 or 6 allows a user to easily identify each path 2, 4 or 6 on the screen 221.

Preferably, the visual appearance of the selectable graphical object associated with a path corresponds to the route symbolism for said path. For example, the selectable graphical object is represented with the same colour as the path with which it is associated when the route symbolism corresponds to a colour.

Thus, in other words, the display process allows, when the user selects a graphical object 20, the system to display the corresponding path. Preferably, the selected graphical object 20 is displayed in a particular way (for example so as to highlight the graphical object or one portion of the graphical object) to distinguish it from the other graphical objects 20.

It will be noted that, according to one particularly advantageous arrangement, the graphical object 20 may be comparable to an icon, and may be selected by a user. Furthermore, depending on an action associated with the graphical object 20 (such as for example: selecting, editing or cancelling a path), the graphical object 20 may have a distinctive graphical characteristic. In other words, for each distinct path and for each action, the method displays one distinct graphical object 20. Thus, as schematically shown in FIG. 5, according to one embodiment, a first graphical object 20a corresponds to a path 2a being edited, a second graphical object 20b corresponds to a path 2b validated by the user and a third graphical object 20c corresponds to a path 2c received from an air-traffic-control authority (ATC).

Particularly advantageously, step 150 is carried out continuously, in parallel with other steps of the method 100. Thus, in other words, the graphical objects 20 are continuously displayed when the path associated with each graphical object exists. In other words, a graphical object 20 is displayed provided that a corresponding path exists.

Each selectable graphical object may be selected or deselected through actions of a user on the graphical object via the human-machine interface 220, and for example by clicking on the object or even by touching it in the case where the human-machine interface 220 is a touch interface.

Selecting a graphical object 20 at any time allows a path associated with this graphical object to be displayed. Subsequently selecting another graphical object allows the path 2, 4, or 6 corresponding to the newly selected graphical object 20 to be displayed.

Furthermore, according to one particular embodiment, when a validated path exists, this validated path is continuously displayed, even if the associated graphical object is not selected. The other paths are displayed only if the corresponding graphical object is selected, only a single graphical object being selected at any given time. Thus, the user may compare the corresponding validated path with the selected path.

Particularly advantageously, a displayed path is displayed on a background map of an airport on which the aircraft is located.

According to one particular arrangement, selecting a graphical object 20 displays the associated path 2, 4 or 6 in an area for displaying a path of the screen (for example on the background map of the airport), this also allowing said path to be edited in an area for displaying a text field or in the area for displaying the path. In the area for displaying a text field, editing is carried out by the user through entry, via the human-machine interface 220, of editing text commands (i.e. character strings). In the area for displaying the path, editing is carried out by the user through manipulation, via the human-machine interface 220, of elements of the path (waypoints for example).

According to one even more particular arrangement, when a graphical object 20 is selected, the action of the user selecting, via the human-machine interface 220, the area for displaying a text field triggers the process of editing the corresponding path 2, 4 or 6.

Particularly advantageously, the path 2 being edited is simultaneously displayed textually in the area for displaying an editing text field and graphically (i.e. in the form of a route) in the area for displaying a path being edited.

As schematically shown in FIG. 5, editing a displayed path has the effect of attributing the value "path being edited" to the status associated with the path being edited. The selectable graphical object associated with this path being edited has a visual appearance corresponding to a path being edited. According to a first alternative, when the displayed path is a previously validated path, or a path received from an air-traffic-control authority, editing the path has the effect of copying it to a new path being edited and of keeping unchanged said validated path or path received from an air-traffic-control authority. Thus, when the displayed path corresponds to a previously validated path, with which is associated a selectable graphical object 20b, a path being edited is created, with which is associated a selectable graphical object 20a. When the displayed path corresponds to a path received from an air-traffic-control authority, with which is associated a selectable graphical object 20c, a path being edited is created, with which is associated a selectable graphical object 20a. If the path being edited is validated, it replaces the previously validated path, the selectable graphical object 20b associated with the validated path is associated therewith, and the selectable graphical object 20a is deleted from the display.

According to a second alternative, when the displayed path is a previously validated path or a path received from an air-traffic-control authority, editing the path has the effect of changing the status of said path, which then takes the value "path being edited". Thus, when the displayed path corresponds to a previously validated path, with which is associated a selectable graphical object 20b, the latter is deleted and a selectable graphical object 20a is associated with the path being edited. When the displayed path corresponds to a path received from an air-traffic-control authority, with which is associated a selectable graphical object 20c, the latter is deleted and a selectable graphical object 20a is associated with the path being edited. If the path being edited is validated, it becomes the validated path and the selectable graphical object 20b associated with the validated path is associated therewith.

According to one particular arrangement, the validated path implemented in the taxiing setpoint of the aircraft may be followed by the aircraft in a manual guidance mode, in which the user manually pilots the aircraft along said path. According to another particular arrangement, the validated path implemented in the taxiing setpoint of the aircraft may be followed by the aircraft in an automatic guidance mode, in which the computer system of the aircraft automatically pilots the aircraft along said path.

According to one particular arrangement, a distinct graphical object is used to display the validated and implemented path, depending on the guidance mode of the aircraft. As indicated above, typically, the distinct graphical object may be a distinct route colour. This arrangement very advantageously allows a user to quickly identify the guidance mode of the aircraft.

Editing Multiple Paths

According to a particularly advantageous technical arrangement, the editing process 110 makes it possible to edit a plurality of distinct alternative paths. Thus, a user (typically a pilot or a co-pilot) may edit a plurality of distinct alternative paths 10.

When a plurality of alternative paths are displayed, the method 100 comprises a step 120 of selecting one alternative path 10 from among the plurality of distinct alternative paths, then obtaining a validation of the selected alternative path 10.

Cancelling a Path

Particularly advantageously, the method 100 may also comprise a step of cancelling a path 2, 4 or 6. In other words, the method 100 makes it possible at any time to cancel a path, whether it is being edited, validated or displayed.

According to one particularly advantageous arrangement, a path may be cancelled by selecting a specific graphical object 20 selection of which sends a cancellation instruction.

Computing System

According to another aspect, a computer system 200 is provided that comprises electronic circuitry configured to implement a method 100 for managing taxiing paths of an aircraft.

Figure 4:
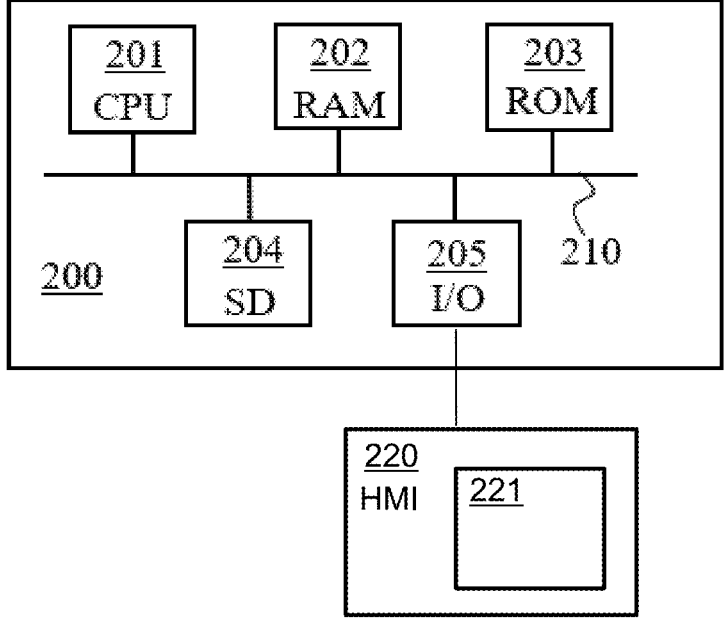
FIG. 4 schematically illustrates a hardware layout of a computer system that comprises electronic circuitry for implementing the method for managing taxiing paths.

As shown schematically in FIG. 4, the computer system 200 may comprise the following, connected by a communication bus 210: a processor 201; a random-access memory 202; a read-only memory 203, for example a ROM (read-only memory) or EEPROM (electrically erasable programmable read-only memory); a storage unit 204, such as a hard disk drive (HDD) or a storage medium reader, such as an SD card reader (SD standing for Secure Digital); and an input/output interface manager 205.

The processor 201 is capable of executing instructions loaded into the random access memory 202 from the read-only memory 203, from an external memory, from a storage medium (such as an SD card), or from a communication network. When the computer system 200 is turned on, the processor 201 is capable of reading instructions from the random-access memory 202 and of executing them. These instructions form a computer program allowing the processor 201 to implement the method 100 and the steps described here.

All or part of the method 100 and all or some of the steps described above may thus be implemented in software form through the execution of a set of instructions by a programmable machine, for example a DSP (digital signal processor) or a microcontroller, or be implemented in hardware form by a machine or a dedicated component, for example an FPGA (field-programmable gate array) or ASIC (application-specific integrated circuit) component. Generally speaking, the computer system 200 comprises electronic circuitry designed and configured to implement, in software form and/or hardware form, the method and steps described above in relation to the computer system 200 in question.

Furthermore, according to one particular arrangement, the computer system 200 comprises a human-machine interface 220 which comprises at least one display screen having at least one area for displaying paths (validated path 4, path 2 being edited, path 6 received from an air-traffic-control authority) and at least one area for displaying a selectable graphical object 20. This screen for example corresponds to an ND (abbreviation of navigation display).

According to one even more particular arrangement, the screen 221 comprises an area for displaying a text field. The area for displaying a text field allows the user to enter text (i.e. a string of characters) corresponding to instructions for editing a path.

Aircraft

According to another aspect, an aircraft comprising the computer system 200 is provided.

The invention claimed is:

1. A method for managing taxiing paths of an aircraft, the aircraft comprising at least one computer system comprising electronic circuitry and a human-machine interface comprising at least one display screen, the method being implemented by the computer system and wherein a status is associated with each taxiing path and in that it comprises at least the following steps:

receiving from a user, via the human-machine interface, editing instructions and editing an initial path depending on said instructions;

associating with the initial path a status the value of which corresponds to a path being edited;

commanding display on the screen of a route of the initial path being edited, using a first route symbolism;

receiving a validation instruction indicating validation of the initial path by the user via the human-machine interface;

associating with the initial path a status the value of which corresponds to a validated path;

commanding display on the screen of a route of the initial path validated by the user, using a second route symbolism;

implementing the initial path validated by the user in a taxiing setpoint of the aircraft;

the method further comprising an editing process which comprises the following steps:

receiving from the user, via the human-machine interface, editing instructions and editing an alternative path depending on said editing instructions;

associating with the alternative path a status the value of which corresponds to a path being edited;

commanding display on the screen of a route of the alternative path being edited, using the first route symbolism;

receiving a validation instruction indicating validation of the alternative path by the user via the human-machine interface;

associating with the alternative path a status the value of which corresponds to a validated path;

replacing display of the route of the initial path validated by the user, with display of the route of the alternative path validated by the user, on the screen using the second route symbolism;

implementing the alternative path validated by the user in the taxiing setpoint of the aircraft; and the method comprising in parallel an independent display process which comprises:

commanding display on the screen of a graphical object selectable via the human-machine interface, the graphical object being distinct for each path and having a visual appearance dependent on the status associated with the path with which this graphical object is associated; and receiving a selection instruction indicating selection by the user of the graphical object via the human-machine interface and displaying on said screen the path corresponding to the selected graphical object, wherein, following receipt of a selection instruction by the user of a graphical object associated with a validated path or with a received path and receipt of an editing instruction by the user on said displayed path, the method comprises:

creating a new path being edited by copying the selected validated or received path;

displaying a new graphical object associated with this new path being edited; and keeping the original validated or received path and its associated graphical object unchanged and available for selection.

2. The method according to claim 1, further comprising the following steps, performed on the new path being edited:

editing the new path being edited depending on instructions received from the user and updating the display on the screen of the route of the new path being edited, using the first route symbolism;

receiving a validation instruction indicating validation of the new path being edited by the user via the human-machine interface;

associating with the new path a status the value of which corresponds to a validated path;

displaying a selectable graphical object associated with the validated new path;

replacing display of the route of a path previously validated by the user, with display of the route of the new path validated by the user, on the screen using the second route symbolism;

implementing the new path validated by the user in the taxiing setpoint of the aircraft.

3. The method according to claim 1, comprising editing a plurality of distinct alternative paths.

4. The method according to claim 1, comprising receiving a cancellation instruction, through selection of the graphical object by the user on the human-machine interface, and comprising cancelling the path corresponding to the graphical object.

5. The method according to claim 1, comprising receiving an editing instruction, through selection of the graphical object by the user on the human-machine interface, and implementing the editing process on the path corresponding to the graphical object.

6. The method according to claim 1, comprising:

receiving a path from an air-traffic-control authority;

receiving from the user, via the human-machine interface, an instruction to display the path received from the air-traffic-control authority;

associating with the path a status the value of which corresponds to a path received from an air-traffic-control authority;

commanding display on the screen of a route of the path received from the air-traffic-control authority, using a third route symbolism;

receiving from the user, via the human-machine interface, a validation instruction indicating validation of the path received from air-traffic control;

associating with the path a status the value of which corresponds to a validated path;

replacing display of the route of the path validated by the user, with display of the route of the path received from the air-traffic-control authority then validated by the user, on the screen using the second route symbolism;

implementing the path received from the air-traffic-control authority then validated by the user, in a taxiing setpoint of the aircraft.

7. The method according to claim 1, comprising:

receiving a path from an air-traffic-control authority;

receiving from the user, via the human-machine interface, an instruction to display the path received from the air-traffic-control authority;

associating with the path a status the value of which corresponds to a path received from an air-traffic-control authority;

commanding display on the screen of a route of the path received from the air-traffic-control authority, using a third route symbolism;

receiving from the user, via the human-machine interface, editing instructions and editing the path received from the air-traffic-control authority depending on said editing instructions;

associating with the path a status the value of which corresponds to a path being edited;

commanding display on the screen of a route of the path being edited using a first route symbolism;

receiving from the user, via the human-machine interface, a validation instruction indicating validation of the path being edited;

associating with the path a status the value of which corresponds to a validated path;

replacing display of the route of the path validated by the user, with display of the route of the path received from the air-traffic-control authority then edited and validated by the user, on the screen using the second route symbolism;

implementing the path received from the air-traffic-control authority then edited and validated by the user, in a taxiing setpoint of the aircraft.

8. A non-transitory storage medium on which is stored a computer program comprising program code instructions for executing the method according to claim 1, when said instructions are read from said non-transient storage medium and executed by a processor.

9. The method according to claim 1, further comprising:

identifying and flagging selectable path states to differentiate path selection options.

10. The method according to claim 9, wherein the selectable path states include ATC approved/cleared states.

11. A computer system for managing a taxiing route of an aircraft comprising electronic circuitry for implementing a method for managing a taxiing route of an aircraft in which a status is associated with each taxiing path, the method comprising at least the following steps:

receiving from a user, via the human-machine interface, editing instructions and editing an initial path depending on said instructions;

associating with the initial path a status the value of which corresponds to a path being edited;

commanding display on the screen of a route of the initial path being edited, using a first route symbolism;

receiving a validation instruction indicating validation of the initial path by the user via the human-machine interface;

associating with the initial path a status the value of which corresponds to a validated path;

commanding display on the screen of a route of the initial path validated by the user, using a second route symbolism;

implementing the initial path validated by the user in a taxiing setpoint of the aircraft;

the method further comprising an editing process which comprises the following steps:

receiving from the user, via the human-machine interface, editing instructions and editing an alternative path depending on said editing instructions;

associating with the alternative path a status the value of which corresponds to a path being edited;

commanding display on the screen of a route of the alternative path being edited, using the first route symbolism;

receiving a validation instruction indicating validation of the alternative path by the user via the human-machine interface;

associating with the alternative path a status the value of which corresponds to a validated path;

replacing display of the route of the initial path validated by the user, with display of the route of the alternative path validated by the user, on the screen using the second route symbolism;

implementing the alternative path validated by the user in the taxiing setpoint of the aircraft; and the method comprising in parallel an independent display process which comprises:

commanding display on the screen of a graphical object selectable via the human-machine interface, the graphical object being distinct for each path and having a visual appearance dependent on the status associated with the path with which this graphical object is associated; and receiving a selection instruction indicating selection by the user of the graphical object via the human-machine interface and displaying on the screen the path corresponding to the selected graphical object, wherein, following receipt of a selection instruction by the user of a graphical object associated with a validated path or a received path and receipt of an editing instruction by the user on said displayed path, the method comprises:

creating a new path being edited by copying the selected validated or received path;

displaying a new graphical object associated with this new path being edited; and keeping the original validated or received path and its associated graphical object unchanged and available for selection.

12. The computer system according to claim 11, wherein the method further comprises, performed on the new path being edited, the following steps:

editing the new path being edited depending on instructions received from the user and updating the display on the screen of the route of the new path being edited, using the first route symbolism;

receiving a validation instruction indicating validation of the new path being edited by the user via the human-machine interface;

associating with the new path a status the value of which corresponds to a validated path;

displaying a selectable graphical object associated with the validated new path;

replacing display of the route of a path previously validated by the user, with display of the route of the new path validated by the user, on the screen using the second route symbolism;

implementing the new path validated by the user in the taxiing setpoint of the aircraft.

13. An aircraft comprising a computer system according to claim 12.

14. The computer system according to claim 11, wherein the display screen has at least one area for displaying a path and at least one area for displaying a selectable graphical object.

15. The computer system according to claim 14, wherein the at least one area for displaying a path is intended to display at least one from among a path validated by a user, a path being edited and a path received from an air-traffic-control authority.

16. The computer system according to claim 14, comprising at least one area for displaying a text field.

17. The computer system according to claim 11, further comprising:

identifying and flagging selectable path states to differentiate path selection options.

18. The computer system according to claim 17, wherein the selectable path states include ATC approved/cleared states.

* * * * *